United States Patent
Keithley (10) Patent No.: US 8,390,868 B1
(45) Date of Patent: Mar. 5, 2013

(54) SYSTEMS AND METHODS FOR MEMORY REDUCTION FOR PRINT HEAD DATA BUFFERING

(75) Inventor: Douglas G. Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 1030 days.

(21) Appl. No.: 12/401,509

(22) Filed: Mar. 10, 2009

Related U.S. Application Data (60) Provisional application No. 61/045,723, filed on Apr. 17, 2008.

(51) Int. Cl.
*G06F 15/00* (2006.01)
*G06K 9/36* (2006.01)

(52) U.S. Cl. .................. 358/1.16; 358/1.17; 358/1.9

(58) Field of Classification Search ............... 358/1.16, 358/1.17, 1.9
See application file for complete search history.

(56) References Cited

U.S. PATENT DOCUMENTS

| | | | | |
|---|---|---|---|---|
| 5,487,137 A | * | 1/1996 | Matsuhira | 358/1.16 |
| 6,628,419 B1 | * | 9/2003 | So et al. | 358/1.16 |
| 2003/0193691 A1 | * | 10/2003 | Tanaka et al. | 358/1.16 |

* cited by examiner

*Primary Examiner* — Qian Yang (57) ABSTRACT

Embodiments of the present invention provide a method comprising providing a compressed image in a memory of a printing device, decompressing at least a portion of the compressed image to provide lines of color data to be printed, organizing the lines of color data within at least one buffer of the printing device, printing a line of color based upon a first line of color data within the lines of color data with a print mechanism of the printing device, and removing the first line of color data from the lines of color data within the at least one buffer after the line of color has been printed.

6 Claims, 5 Drawing Sheets

SYSTEMS AND METHODS FOR MEMORY REDUCTION FOR PRINT HEAD DATA BUFFERING

CROSS REFERENCE TO RELATED APPLICATIONS

The present application claims priority to U.S. Patent Application No. 61/045,723, filed Apr. 17, 2008, entitled "Memory Reduction for Print Head Data Buffering," the entire specification of which is hereby incorporated by reference in its entirety for all purposes, except for those sections, if any, that are inconsistent with this specification.

TECHNICAL FIELD

Embodiments of the present invention relate to the field of data processing, and more particularly, to image data processing for generating images.

BACKGROUND

Currently, supporting a print mechanism of a printing device that has multiple horizontal print lines being generated by the printing device entails buffering all of the data for all colors that are in the image to be printed under an image forming area of the print mechanism. Generally, the print mechanism comprises one or more print heads.

Figure 1:
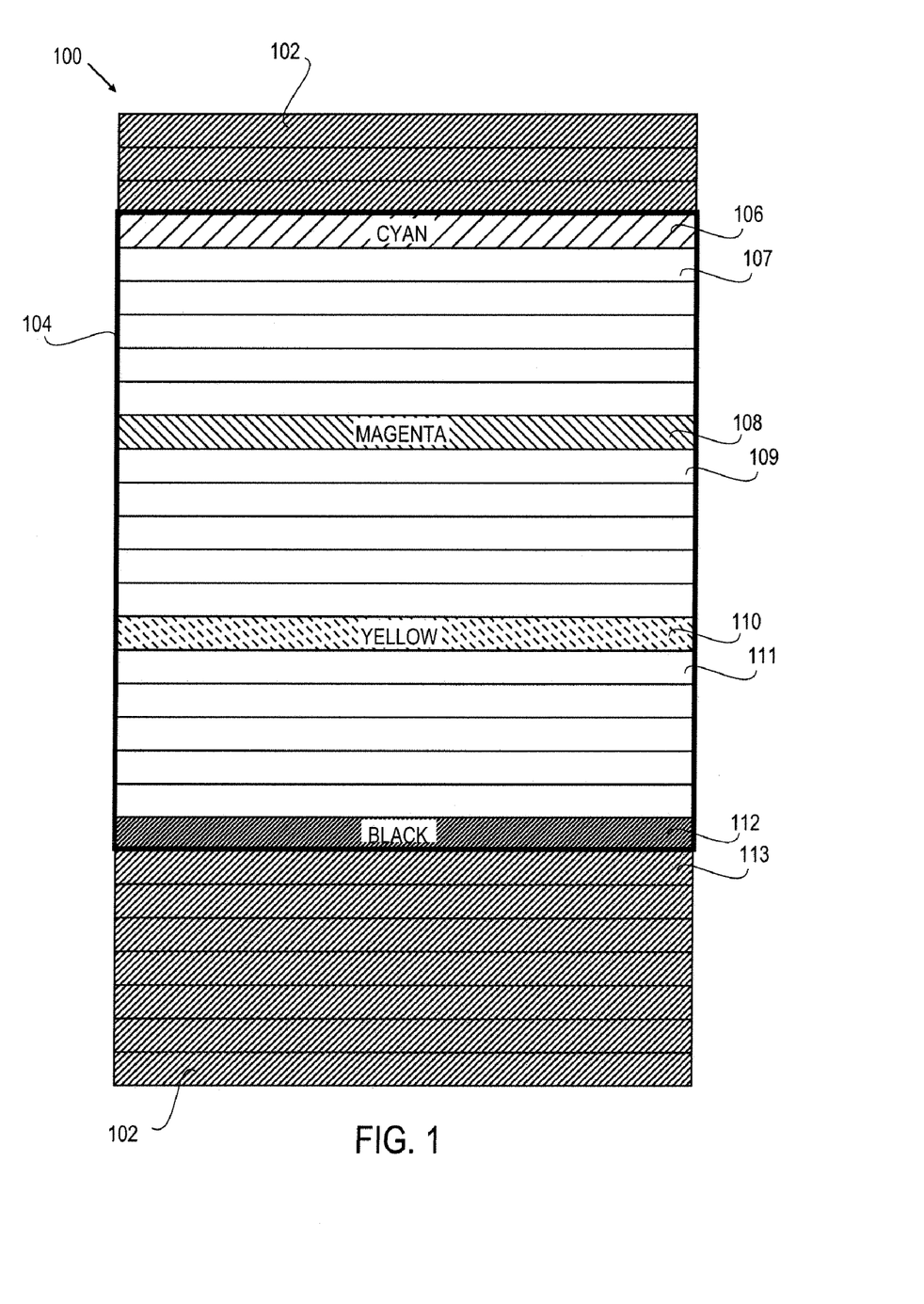
FIG. 1 schematically illustrates image data to be printed, in accordance with various embodiments of the present invention.

Referring to FIG. 1, image data 100 to be printed is schematically illustrated as multiple lines of print data. The darker gray regions 102 represent image data to be printed, while the image forming area 104 represents image data that is under some portion of an image forming area of the print mechanism. The print mechanism may be located in a color laser printer, which includes moving mirrors, modulated lasers, and toner developers. The print mechanism may also be located in an ink printer, which includes one or more ink heads, a thermal printer, which includes thermal heating elements, or some other image forming mechanism.

In the example represented by FIG. 1, each color is being printed on a single line and each of these color lines is six lines away from another color line being printed, i.e., five lines of image between each color are not being actively printed, and some may have already been printed by some of the other colors. With the example of FIG. 1, there are four color lines being printed, specifically, cyan 106, magenta 108, yellow 110 and black 112. Each print line, cyan 106, magenta 108, yellow 110 and black 112, schematically represents a laser beam within the print mechanism that prints the respective line of print data for the respective color.

There may be multiple lines of a single color being written to the image data, for example, one working on even lines and one working only on odd lines. The multiple lines of the same color may have a different spacing compared to the spacing of the different colors. For example, if each color is printed as two lines at a time (one even and one odd) and the even lines are represented in FIG. 1, the odd lines for each color may be located directly below each of the same color's even lines. The odd line image forming lines may also be located farther away.

Generally, with most printing devices, the print mechanism moves along the print medium in a downward fashion. Thus, the print mechanism begins printing based upon the bottom portion of the image forming area 104, i.e., in the example of FIG. 1, the black print line 112 of print data. Once the black print line 112 of print data has been deposited on the print medium as a black line of color, as well as the yellow line 110, magenta line 108 and cyan line 106, the print mechanism will move further down along the print medium and another line of print data may be utilized to determine another line of color to be deposited on the print medium one line below lines 106, 108, 110 and 112 (specifically, lines 107, 109, 111 and 113). As the yellow print line 110 moves downward, it will print five more lines of data before it reaches line 112. Likewise, as the magenta print line 108 moves downward, it will print eleven more lines of data before it reaches line 112 and as the cyan print line 108 moves downward, it will print seventeen more lines before it reaches line 112. Thus, each line actually represents four lines of print data, one line of print data for cyan, magenta, yellow and black.

As previously noted, with the example of FIG. 1, there are four lines of colors being printed, specifically, cyan 106, magenta 108, yellow 110 and black 112. These are generally referred to in the art as C, M, Y and K, respectively. Thus, in the example of FIG. 1, there are currently 19 lines (within image forming area 104) of C, M, Y and K data buffered in some type of memory. Accordingly, in the example of FIG. 1, there are 76 lines of stored data (19 lines for each of the four colors C, M, Y and K within image forming area 104). For a dual beam system (two laser beams per color, with one laser working on even lines and one laser working on odd lines simultaneously), both laser beams desire data simultaneously. Thus, two lines of data are needed for each color and therefore, image forming area 104 needs to include an additional line of data, for example, line 113. Therefore, if the even and odd lines of data are adjacent to one another, there would be 80 lines of stored data (20 lines for each of the four colors C, M, Y and K within image forming area 104).

Such buffering of data requires a large amount of memory. Thus, if one may significantly lower the amount of data stored that is not being immediately used, less memory may be required in the printing device and thus, a cost savings may be realized.

SUMMARY

The present invention provides a method comprising providing a compressed image in a memory of a printing device, decompressing at least a portion of the compressed image to provide lines of color data to be printed, organizing the lines of color data within at least one buffer of the printing device, printing a line of color based upon a first line of color data within the lines of color data with a print mechanism of the printing device, and removing the first line of color data from the lines of color data within the at least one buffer after the line of color has been printed.

In accordance with various embodiments, the at least a portion of the compressed image is decompressed multiple times and the lines of color data are organized within multiple buffers, each buffer corresponding to a particular color.

In accordance with various embodiments, the at least a portion of the compressed image is decompressed by multiple decompressors, wherein each decompressor corresponds to a particular color.

In accordance with various embodiments, the particular color is from a group comprising cyan, magenta, yellow and black.

In accordance with various embodiments, at least two lines of color are printed simultaneously based upon the first line of color data and a second line of color data, respectively.

The present invention also provides a printing apparatus comprising memory for storing a compressed image, at least one decompressor operatively coupled to the memory to decompress the compressed image into lines of print data, at least one buffer operatively coupled to the at least one decompressor to store the lines of print data, a printing mechanism configured to print a corresponding line of color based upon a line of print data within the at least one buffer, and a processor configured to remove the line of print data from the at least one buffer after the printing mechanism prints the corresponding line of color.

In accordance with various embodiments, the printing apparatus further comprises more than one decompressor, each decompressor corresponding to a particular color to be printed.

In accordance with various embodiments, the printing apparatus further comprises more than one buffer, each buffer corresponding to one of the more than one decompressor.

In accordance with various embodiments, the particular color to be printed is from a group comprising cyan, magenta, yellow and black.

In accordance with various embodiments, each of the decompressors is configured to decompress at least two lines of print data at a time.

In accordance with various embodiments, each buffer is configured to store the at least two lines of print data.

In accordance with various embodiments, each buffer is configured to store at least four lines of print data.

In accordance with various embodiments, the printing apparatus further comprises at least eight decompressors, wherein two each of the decompressors correspond to a particular color to be printed.

In accordance with various embodiments, the printing apparatus further comprises at least eight buffers, each buffer corresponding to one of the at least eight decompressors.

In accordance with various embodiments, the printing apparatus further comprises more than one decompressor per a particular color to be printed.

In accordance with various embodiments, the printing apparatus further comprises more than one buffer per a particular color to be printed.

The present invention also provides a method comprising providing a compressed image in a memory of a printing device, decompressing at least a portion of the compressed image to provide a first line of color data to be printed, providing the first line of color data to a buffer of the printing device, printing a first line of color based upon the first line of color data with a print mechanism of the printing device, removing the first line of color data from the buffer after the first line of color has been printed, decompressing the at least a portion of the compressed image to provide a second line of color data to be printed, providing the second line of color data to a buffer of the printing device, printing a second line of color based upon the second line of color data with the print mechanism of the printing device, removing the second line of color data from the buffer after the second line of color has been printed, and repeating the foregoing steps until the at least a portion of the compressed image has been decompressed and all lines of color data have been printed as lines of color.

In accordance with various embodiments, the compressed image is decompressed by multiple decompressors, wherein each decompressor corresponds to a particular color.

In accordance with various embodiments, at least two lines of color are printed simultaneously based upon the first line of color data and the second line of color data, respectively.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 2:
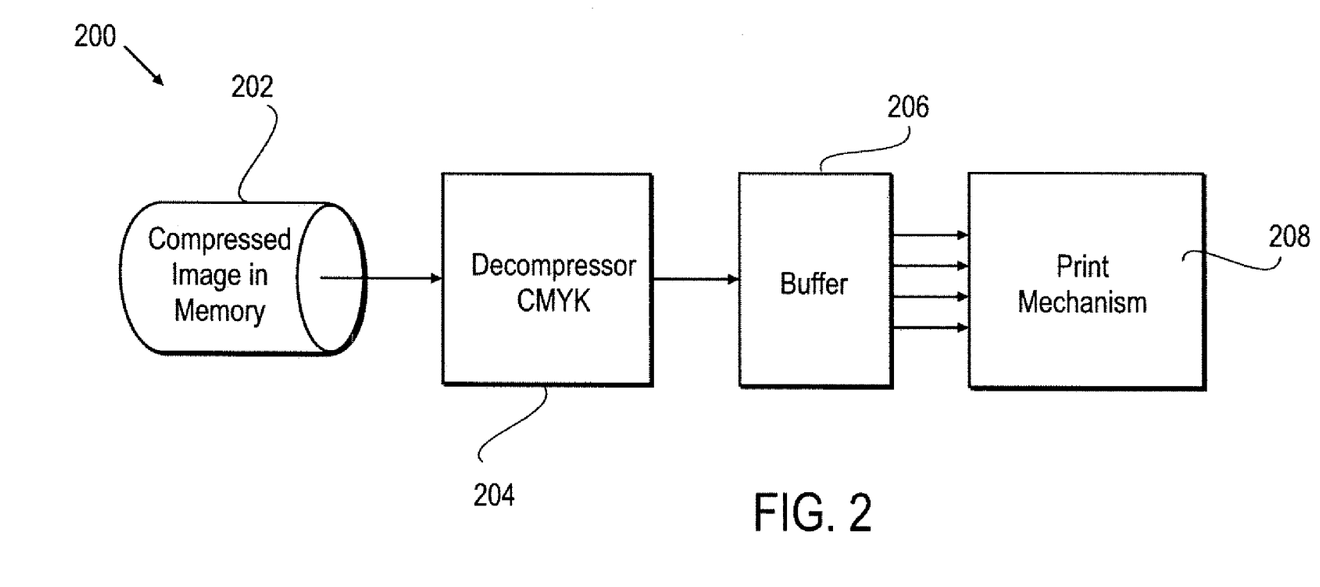
FIG. 2 schematically illustrates a printing device, in accordance with various embodiments of the present invention.

Referring to FIG. 2, various components for a printing device 200 are illustrated. The printing device 200 includes memory 202, decompressor 204, buffer 206, and a print mechanism 208. A compressed image to be printed may be provided to the memory 202. As is known in the art, compression schemes that are most effective need all of the color for a single pixel. Accordingly, compression schemes generally generate the color data in a way that is different than the consumption of the color data. Examples of compression schemes include JPEG and compression in the RGB color plane (red, green and blue). The compression may be in some other color space and a color space converter may also be included in the decompressor 204.

The decompressor 204 decompresses the compressed image such that an image to be printed is broken into lines of print data. Each line of print data is related to a color. In accordance with various embodiments, the colors may be from a group comprising cyan, magenta, yellow and black. Those skilled in the art will understand that more colors may be included if desired.

The decompressed lines of print data are then provided to the buffer 206 where they are stored. As the print mechanism 208 moves over a print medium, lines of print data are used by the print mechanism 208 in order to deposit lines of color on a print medium.

Thus, referring back to FIG. 1, as the print mechanism 208 moves along the print medium, lines of data within the image forming area of the print mechanism 208 dictate to the print mechanism 208 with respect to depositing lines of color. As previously discussed, generally, with most printing devices, the print mechanism 208 moves along the print medium in a downward fashion. Thus, the print mechanism 208 begins printing based upon the bottom portion of the image forming area 104, i.e., in the example of FIG. 1, the black print line 112 of print data. Once the black print line 112 of print data has been deposited on the print medium as a black line of color, as well as the yellow line 110, magenta line 108 and cyan line 106, the print mechanism 208 will move further down along the print medium and another line of print data may be utilized to determine another line of color to be deposited on the print medium one line below lines 106, 108, 110 and 112 (specifically, lines 107, 109, 111 and 113). As the yellow print line 110 moves downward, the print mechanism 208 will print five more lines of data before it reaches line 112. Likewise, as the magenta print line 108 moves downward, the print mechanism 208 will print eleven more lines of data before it reaches line 112 and as the cyan print line 108 moves downward, the print mechanism 208 will print 17 more lines before it reaches line 112.

In accordance with various embodiments of the present invention, once a print line of data has been processed and a corresponding line of color has been deposited on a print medium, the line of print data is removed from the buffer 206. Thus, if the printing is proceeding in a downward manner as previously described, after the black line of print data has been printed as a black line of color at 112, it is no longer held within the buffer 206. Accordingly, all data relating to lines of print data for a single color above the line that is printing may be removed from the buffer 206. Therefore, in the example of an image forming area 104 as depicted in FIG. 1, the buffer 206 will need to maintain one line of print data for the current black line 112 that is being printed, seven lines of print data for yellow, e.g., the line being printed at 110, the five lines following line 110 and a line of data for line 112. Likewise, thirteen lines of print data need to be maintained in buffer 206 for magenta, e.g., the line being printed at 108, the five lines following line 108, a line of data for line 110, the five lines following line 110, and a line of data for line 112, and 19 lines of print data need to be maintained in the buffer 206 for cyan, e.g., the line being printed at 106, the five lines following line 106, a line of data for line 108, the five lines following line 108, a line of data for line 110, the five lines following line 110, and a line of data for line 112. Thus, in accordance with various embodiments of the present invention, only a total of 40 lines of print data need to be stored within the buffer 206 for all four colors.

For even/odd printing with a dual beam printing system, the even and odd lines may have a different storage arrangement within the buffer 206. However, as previously discussed, an extra line of print data needs to be stored within the buffer 206. Thus, the total number of data lines within buffer 206 would be 44. Even lines of print data stored within buffer 206 would include 1 line of print data for black, 4 lines of print data for yellow, 7 lines of print data for magenta and 10 lines of print data for cyan for a total number of 22 lines of print data. Likewise, odd lines of print data stored within buffer 206 would include 1 line of print data for black, 4 lines of print data for yellow, 7 lines of print data for magenta and 10 lines of print data for cyan for a total number of 22 lines of print data. Thus, for a dual beam printing system, 44 lines of print data would be stored within buffer 206. Put another way, for a single laser beam per color system, there are 4 color lines 112 (one for each color), 3 color lines for each of the 6 lines beginning at 110, 2 color lines for each of the 6 lines beginning at 108, and just a single color line for each of the 6 lines beginning at 106 for a total of 40 lines of storage (4+18+12+6) within buffer 206. A two beam per color system with adjacent even/odd data for the beams will be the same plus there is an additional 4 color lines at 113 for a total of 44 lines of storage within buffer 206.

Those skilled in the art will understand that the schematic arrangement illustrated in FIG. 1 is merely an example and that there may be more or fewer lines illustrated within image forming area 104, the spacing between print lines may be different and do not have to be the same between each color. The order of the colors may be different and there may more or fewer colors and the colors themselves may be different.

Figure 3:
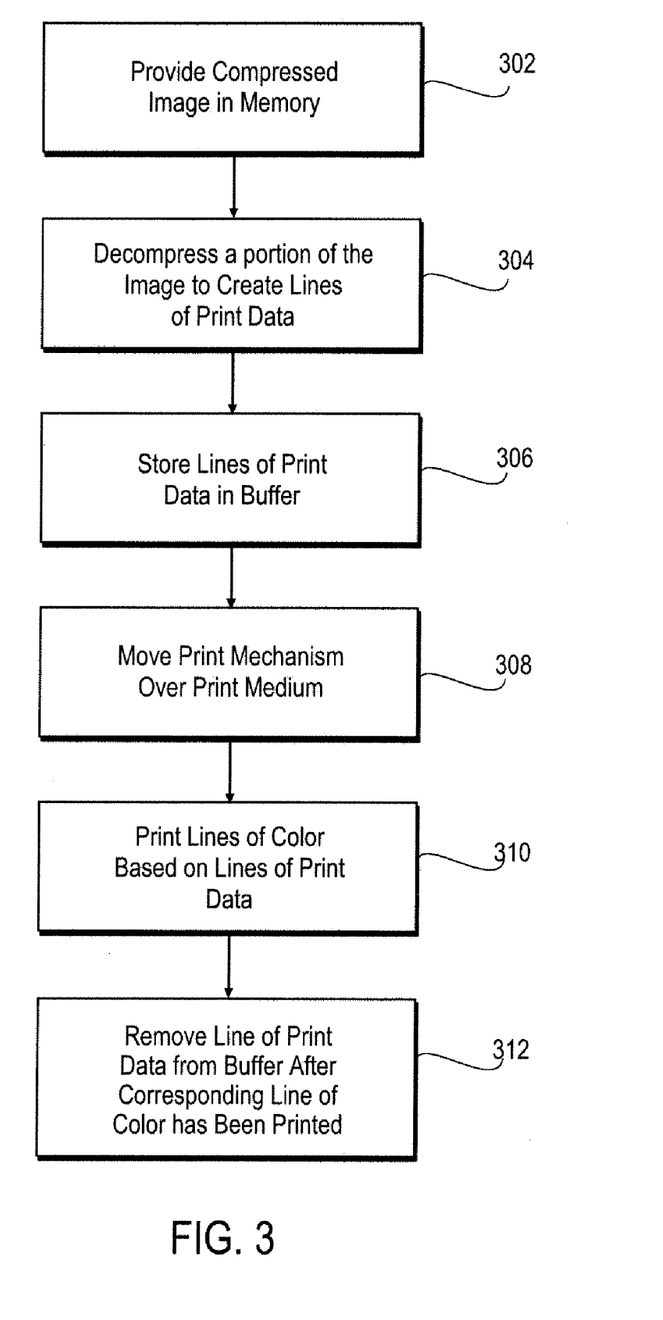
FIG. 3 is a flow chart depicting a printing method, in accordance with various embodiments of the present invention.

Accordingly, referring to FIG. 3, in accordance with various embodiments of the present invention, a compressed image to be printed is provided in memory at 302. The decompressor 204 decompresses a portion of the compressed image to create lines of print data at 304. The lines of print data are stored in the buffer at 306. The print mechanism 208 is moved over a print medium at 308 and lines of color are printed on the print medium based on lines of print data at 310. Lines of print data are removed from the buffer 206 after corresponding lines of color have been printed at 312.

Figure 4:
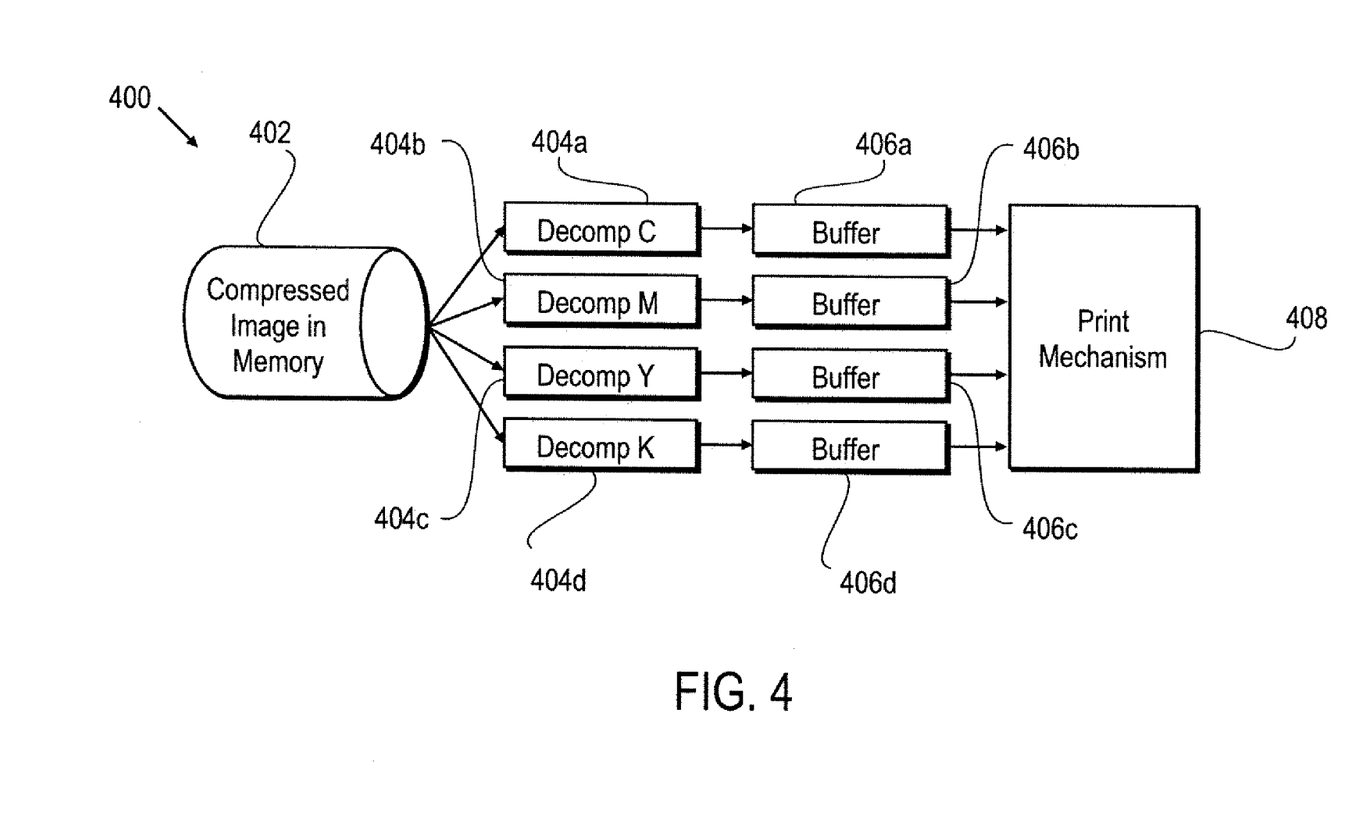
FIG. 4 schematically illustrates another printing device, in accordance with various embodiments of the present invention.

Referring to FIG. 4, in accordance with various embodiments of the present invention, instead of a single decompressor 204 that outputs multiple color lines of print data together for each pixel, a printing device 400 may include four decompressors 404*a, b, c, d* that decompress the compressed image multiple times, with each decompressor 404 a, b, c, d corresponding to a color. Four buffers 406*a, b*, c, d are provided that correspond to the four decompressors 404*a, b, c, d*. Thus, a decompressor and a corresponding buffer may correspond together to a particular color. For example, a decompressor 404*d* and corresponding buffer 406*d* may correspond to black; another decompressor 404*c* and corresponding buffer 406*c* may correspond to yellow; another decompressor 404*b* and corresponding buffer 406*b* may correspond to magenta; and another decompressor 404*a* and corresponding buffer 406*a* may correspond to cyan. The printing device 400 also includes a memory 402 and a print mechanism 408.

Accordingly, in such an embodiment, only one line of print data needs to be maintained for each color. The increased cost of adding additional decompressors may be significantly smaller than the cost saving of the lowered memory requirements. Those skilled in the art will understand that a single buffer may be provided as opposed to four buffers, with the single buffer being partitioned into four buffer portions, with each buffer portion corresponding to a particular decompressor.

Accordingly, in accordance with this embodiment of the present invention depicted in FIG. 4, only four total color lines of print data need to be stored within the buffers 406*a, b, c, d*. This removes nearly 95% of the storage required for the example recited in the Background with reference to FIG. 1. If the spacing between colors with regard to the lines of print data within the image forming area 104 of the print mechanism is larger, then the savings may be even more significant.

In accordance with various embodiments, depending upon the order of the data being consumed by the print mechanism and the order that the lines of print data is provided from the decompressors, the buffers may be eliminated altogether. While the compressed image does need to be read and decompressed multiple times, this is only a small bandwidth impact upon the system that may not incur any additional cost.

Figure 5:
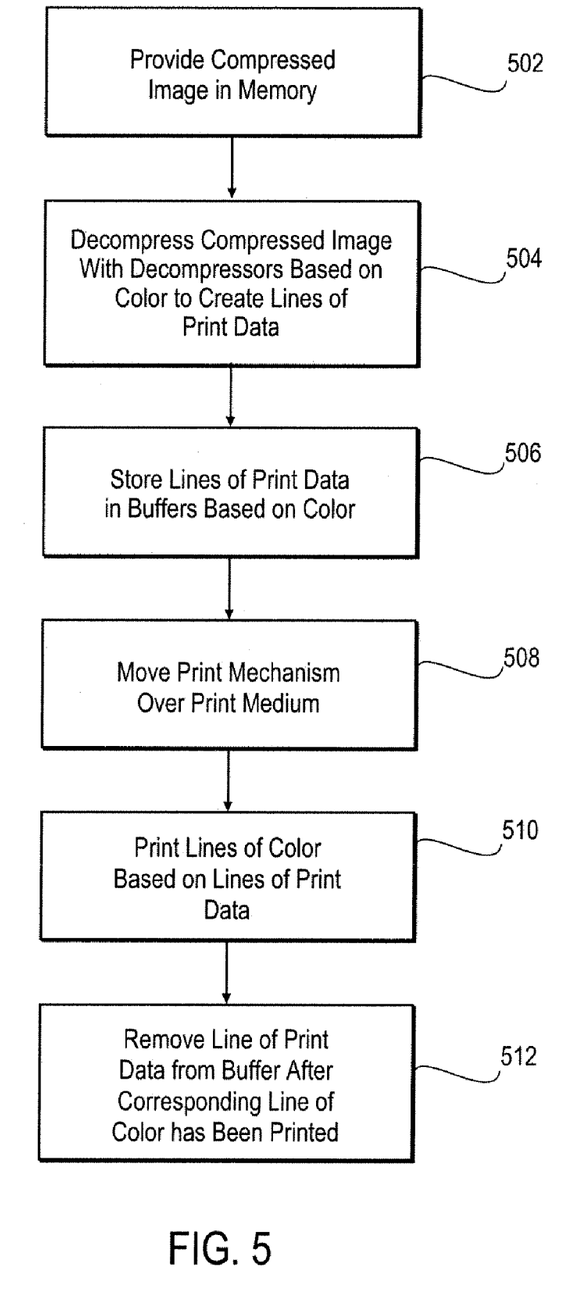
FIG. 5 is a flow chart depicting another printing method, in accordance with various embodiments of the present invention.

Thus, referring to FIG. 5, a compressed image may be provided in memory at 502. The compressed image may then be decompressed with the various decompressors at 504, wherein each decompressor decompresses the compressed image based upon a color to create lines of print data. The lines of print data are then stored in corresponding buffers, which are based on color, at 506. The print mechanism is moved over a print medium at 508 and lines of color are printed based upon lines of print data at 510. Each line of print data is removed from its buffer after a corresponding line of color has been printed at 512.

In accordance with various embodiments of the present invention, with the embodiment illustrated and described with reference to FIG. 3, the printing device 400 may be configured to print even/odd adjacent lines using two laser beams per color. Rather than having eight decompressors (one for each color/even line and one for each color/odd line) and eight corresponding buffers, the embodiment may simply be configured such that each decompressor 404a, b, c, d decompresses two lines for each color and stores the two lines of print data (one even and one odd) into a corresponding buffer 406a, b, c, d. Thus, the print mechanism will process and print two lines of print data at a time and thus, each buffer 406a, b, c, d would store four lines of print data.

More particularly, some decompressors generate just a single line of print data at a time, while others generate multiple lines of print data at a time. If a single line decompressor is used to generate lines of print data, it must generate the data at twice the rate of each of the two laser beams (same as the two laser beams combined), since it must generate two sequential lines of print data in the same amount of time that two laser beams will consume two lines of print data in parallel. This serial to parallel nature of the generation and consumption of lines of print data makes it difficult to buffer the two lines of print data with just two lines of buffer. It is more straight forward to buffer ahead of the consumption and just fill two lines of buffer while a separate two lines of buffer are being read. The two sets of two print lines of data just "ping-pong" back and forth always filling two lines in the buffer sequentially and reading in parallel from the other two lines in the buffer.

Accordingly, for such an embodiment, only 16 color lines of print data are stored in the buffers (four lines per color). This removes nearly 80% of the needed storage as described with regard to the example for the dual beam system in the Background wherein 80 lines of print data are stored in a buffer. While once again the compressed image does need to be read multiple times for decompression, this is only a small bandwidth impact on the system and may not incur much, if any, additional cost.

In an embodiment in which a decompressor may produce two lines of print data at a time (in parallel), then it may be nearly identical to the single laser beam per color system and only two lines of color data per color would be needed, and possibly no buffers if the order of generation and consumption were the same. If only two lines per color are decompressed, then there would be eight total lines of print data in the buffer so only 90% of the storage is needed in comparison to the dual beam system example in the Background, wherein 80 lines of print data are stored in a buffer.

While the present invention has been described with reference to a printing system that prints 4 colors (C, M, Y, K) and one or two laser beams per color, those skilled in the art will understand that the present invention may used with other printing systems, for example a printing system that prints with just three colors, e.g., C, M, Y., wherein such system uses either one laser beam per color or two laser beams per color. Likewise, the present invention may used with a printing system that prints with more than four colors, wherein such system uses either one laser beam per color or two laser beams per color.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A printing apparatus comprising:
   memory configured to store a compressed image, wherein the compressed image comprises an image stored in a compressed format;
   a plurality of decompressors corresponding to a plurality of colors such that each of the plurality of decompressors is associated with a corresponding color of the plurality of colors, wherein the image comprises one or more of the plurality of colors, wherein each of the plurality of decompressors is operatively coupled to the memory to decompress the compressed image into corresponding lines of print data for the corresponding color of the plurality of colors;
   a plurality of buffers corresponding to the plurality of colors, wherein each buffer of the plurality of buffers is operatively coupled to a corresponding decompressor of the plurality of decompressors to store at least four lines of print data for the corresponding color of the plurality of colors;
   a printing mechanism configured to print, using two laser beams for each color of the plurality of colors, lines of print data for the plurality of colors of the image stored in the plurality of buffers, wherein each decompressor of the plurality of decompressors is configured to decompress the compressed image into corresponding lines of print data for the corresponding color of the image at a rate that is at least twice a rate at which each of the two laser beams for the corresponding color prints lines of print data for the corresponding color; and
   a processor configured to remove a first line of print data for a first color of the plurality of colors from a first buffer of the plurality of buffers after the printing mechanism prints the first line of print data for the first color.

2. The printing apparatus of claim 1, wherein the plurality of colors is from a group comprising cyan, magenta, yellow and black.

3. The printing apparatus of claim 1, wherein each of the plurality of decompressors is configured to decompress at least two lines of print data at a time.

4. A method comprising:

storing a compressed image in a memory of a printing device, wherein the compressed image comprises an image stored in a compressed format;

associating a plurality of decompressors with a plurality of colors such that each of the plurality of decompressors is associated with a corresponding color of the plurality of colors, wherein the image comprises one or more of the plurality of colors;

for each color of the plurality of colors, decompressing the compressed image into corresponding lines of print data for the corresponding color of the plurality of colors;

forming a plurality of buffers corresponding to the plurality of colors, wherein each buffer of the plurality of buffers is operatively coupled to a corresponding decompressor of the plurality of decompressors to store at least four lines of print data for the corresponding color of the image;

printing, using two laser beams for each color of the plurality of colors, lines of print data for the plurality of colors of the image stored in the plurality of buffers, wherein each decompressor of the plurality of decompressors is configured to decompress the compressed image into corresponding lines of print data for the corresponding color of the image at a rate that is at least twice a rate at which each of the two laser beams for the corresponding color prints lines of print data for the corresponding color; and removing a first line of print data for a first color of the plurality of colors from a first buffer of the plurality of buffers after the first line of print data for the first color is printed.

5. The method of claim 4, wherein the plurality of colors is from a group comprising cyan, magenta, yellow and black.

6. The method of claim 4, wherein each of the plurality of decompressors is configured to decompress at least two lines of print data at a time.

\* \* \* \* \*